United States Patent
Ryu

(10) Patent No.: US 6,977,697 B2
(45) Date of Patent: Dec. 20, 2005

(54) METHOD FOR MANUFACTURING LIQUID CRYSTAL DISPLAY DEVICE

(75) Inventor: Hee Yeong Ryu, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/610,905

(22) Filed: Jul. 2, 2003

(65) Prior Publication Data

US 2004/0017527 A1 Jan. 29, 2004

(30) Foreign Application Priority Data

Jul. 29, 2002 (KR) .............................. 10-2002-0044657

(51) Int. Cl.⁷ ..................... G02F 1/1335; G02F 1/1333; G02F 1/1343; G02F 1/1345; G02F 1/13
(52) U.S. Cl. ..................... 349/113; 349/138; 349/149; 349/187
(58) Field of Search .......................... 349/113, 138, 349/149, 187

(56) References Cited

U.S. PATENT DOCUMENTS

| | | | | |
|---|---|---|---|---|
| 5,408,345 A | | 4/1995 | Mitsui et al. | |
| 6,081,310 A | * | 6/2000 | Katsuya et al. | 349/113 |
| 6,426,787 B1 | * | 7/2002 | Satake et al. | 349/138 |
| 2002/0063825 A1 | * | 5/2002 | Sakurai et al. | 349/113 |
| 2003/0086046 A1 | * | 5/2003 | You | 349/149 |
| 2004/0070709 A1 | * | 4/2004 | Kanou et al. | 349/113 |

* cited by examiner

*Primary Examiner*—Huyen Ngo
(74) *Attorney, Agent, or Firm*—McKenna Long & Aldridge LLP

(57) ABSTRACT

A method for manufacturing an LCD device is disclosed, which has a reflective electrode having protrusions formed by simplified manufacturing process steps, thereby improving reflectivity. The method includes: forming a first insulating layer on a substrate; forming a photoresist layer on the first insulating layer, wherein the photoresist layer has a plurality of rounded protrusions and rounded valleys; forming a plurality of rounded protrusions and rounded valleys on the first insulating layer by etching the first insulating layer and the photoresist layer; and forming a reflective electrode on the first insulating layer.

18 Claims, 10 Drawing Sheets

METHOD FOR MANUFACTURING LIQUID CRYSTAL DISPLAY DEVICE

This application claims the benefit of the Korean Application No. P2002-44657 filed on Jul. 29, 2002, which is hereby incorporated by reference for all purposes as if fully set forth herein.

BACKGROUND OF THE INVENTION

1. Field of the Invention

The present invention relates to a method for manufacturing a liquid crystal display (LCD) device, and more particularly, to a method for manufacturing an LCD device for improving reflectivity.

2. Discussion of the Related Art

With development of the information society, the demand for various display devices increases. Accordingly, many efforts have been made in researching and developing various flat display devices such as the liquid crystal display (LCD), the plasma display panel (PDP), the electro luminescent display (ELD), and the vacuum fluorescent display (VFD), and some species of these flat display devices are already applied to displays of various equipment.

Among the various flat display devices, the LCD device has been the most widely used due to its advantages of thinness, lightness in weight, and low power consumption, whereby the LCD device substitutes for the Cathode Ray Tube (CRT). In addition to the mobile type LCD devices such as the display for a notebook computer, LCD devices have been developed for computer monitors and televisions to receive and display broadcasting signals.

Despite various technical developments in LCD technology with applications in different fields, research in enhancing the picture quality of the LCD device has been in some respects lacking as compared to other features and advantages of the LCD device. Therefore, in order to use the LCD device in various applications as a general display, should produce a high quality picture, for example with high resolution and high luminance within a large-sized screen while still being light weight, thin, and low power.

An LCD device displays an image or a picture by controlling the light transmittance of a liquid crystal with an electric field having a dielectric anisotropy.

The LCD device is different from display devices such as an electro luminescence (EL) device, a cathode ray tube (CRT) and a light emitting diode (LED) device. The EL, CRT and LED devices each emit light, but the LCD device makes use of ambient light as a light source.

There are two different types of LCD devices, a transmitting type LCD device and a reflective type LCD device. The transmitting type LCD device has a backlight as a light source at the rear of the LCD panel, whereby the transmitting type LCD device can display a picture image in low light surroundings by controlling the light transmittance according to the alignment of the liquid crystal. However, the transmitting type LCD device has problems in that it has high power consumption. Meanwhile, the reflective type LCD device uses ambient light as a light source, thereby having a relatively low power consumption. However, the reflective type LCD device has problems in that it cannot display a picture image in low light surroundings.

In order to solve the problems of both the transmitting and reflective type of LCD devices, a transflective LCD device is proposed. The transflective LCD device can be used as a reflective type or a transmitting type of LCD device as needed.

FIG. 1 is a cross-sectional view illustrating a related art reflective color LCD device. Referring to FIG. 1, the related art reflective color LCD device includes an upper substrate 13 having a color filter layer (not shown) and a common electrode 17, a lower substrate 11 having a thin film transistor (not shown) and a reflective electrode 16, and a liquid crystal 19 between the lower and upper substrates 11 and 13. At this time, liquid crystal molecules of the liquid crystal 19 are aligned in a predetermined direction by the electric field, i.e., the liquid crystal 19 is an optical anisotropy medium controlling the light transmittance according to the alignment of the liquid crystal molecules. Herein, it is possible to use a predetermined medium having the optical anisotropy characteristics instead of the liquid crystal 19.

In addition, plurality of medium layers are formed on external surfaces of the respective lower and upper substrates 11 and 13 to control the light polarization state. For example, a scattering film 21, a retardation film 23, and a polarizing plate 25 are sequentially deposited on the upper substrate 13. The scattering film 21 is formed to obtain a wide view angle by scattering light, and the retardation film 23 includes a first phase difference film having the characteristics of $\lambda/4$ plate to affect the light to the reflective electrode, and a second phase difference film having the characteristics of $\lambda/2$ plate.

When a voltage is not applied to the retardation film 23 in a turn-off state, the phase of the light is inversed, thereby emitting a mount of lights to the outside. Thus, an LCD panel having high luminance characteristics is formed. Also, the polarizing plate 25 only passes light having a specified polarization.

FIG. 2 is a plan view illustrating an array substrate for a reflective type LCD device according to the related art. As shown in FIG. 2, a plurality of gate lines 33 are formed on a lower substrate 11 in one direction at fixed intervals, and a plurality of data lines 36 are formed in perpendicular to the gate lines 33 at fixed intervals to define a plurality of pixel regions. A matrix type pixel electrode (reflective electrode) 16 is formed in each pixel region P defined by crossing the gate lines 33 to the data lines 36. Then, a plurality of thin film transistors T are formed that are switched according to a signal on the gate line 33 to transmit the signal on the data line 36 to the pixel electrode (reflective electrode) 16.

At this time, the thin film transistor T includes a gate electrode 27 extending from the gate line 33, a gate insulating layer (not shown) on the entire surface of the lower substrate 11, a semiconductor layer 30 on the gate insulating layer above the gate electrode 27, a source electrode 29 extending from the data line 36, and a drain electrode 31 opposite to the source electrode 29. The drain electrode 31 is electrically connected to the pixel electrode 16 through a contact hole 35.

Meanwhile, the lower substrate 11 is bonded to an upper substrate (not shown) with a predetermined space.

The upper substrate includes a black matrix layer preventing light from leaking. The black matrix layer has an opening corresponding to the pixel region P of the lower substrate 11, R/G/B color filter layers for displaying colors, and a common electrode for driving the liquid crystal with the pixel electrode (reflective electrode) 16.

The predetermined space is maintained between the lower and upper substrates 11 and 13 by spacers, and then the lower and upper substrates 11 and 13 are bonded to each other by a sealant having a liquid crystal injection hole. Subsequently, the liquid crystal is injected between the lower and upper substrates 11 and 13 through the liquid crystal injection hole.

FIG. 3 is a cross-sectional view illustrating an LCD device taken along line II-II' of FIG. 2. Referring to FIG. 3, a conductive metal material such as aluminum Al, aluminum alloy, molybdenum Mo, tungsten W, or chrome Cr is deposited on the lower substrate 11, and then selectively patterned by photolithography, thereby forming the gate line 33 and the gate electrode 27 extending from the gate line 33. Then, a gate insulating layer 28 is formed by an inorganic insulating material such as silicon nitride $SiN_x$ or silicon oxide $SiO_x$ or by an organic insulating material such as Benzo-CycloButene BCB or acryl. Subsequently, an amorphous silicon including pure amorphous silicon and impurities is formed on the entire surface of the lower substrate 11 including the gate insulating layer 28, and then selectively removed by photolithography, thereby forming the island-shaped semiconductor layer 30 on the gate insulating layer 28 above the gate electrode 27.

Next, the aforementioned conductive metal layer is deposited on the entire surface of the lower substrate 11 including the semiconductor layer 30, and then selectively removed by photolithography, whereby the data line 36 is formed substantially perpendicular to the gate line 33. The source electrode 29 is formed on the semiconductor layer partially overlapping the gate electrode 27, and the drain electrode 31 is formed apart from the source electrode 29. Then, a passivation layer 36 is formed of an organic insulating material such as BenzoCycloButene (BCB) or acrylic resin, and then selectively removed to expose the drain electrode 31 by photolithography, thereby forming the contact hole 35. An opaque metal having great reflectivity such as aluminum Al is deposited on the entire surface of the passivation layer 36 and contact hold 35 of the lower substrate 11 and then selectively removed by photolithography, whereby the pixel electrode (reflective electrode) 16 is formed in the pixel region P electrically connected to the drain electrode 31 through the contact hole 35.

The method for manufacturing the related art LCD device will be described with reference to FIGS. 4–6. FIG. 4 is a plan view illustrating the related art LCD device having the reflective electrode including a protrusion, and FIG. 5 is a cross-sectional view illustrating the related art LCD device taken along line IV-IV' of FIG. 4.

As shown in FIG. 4 and FIG. 5, the thin film transistor T (gate electrode 27, gate insulating layer 28, source electrode 29, drain electrode 31 and semiconductor layer 30), is formed on the lower substrate 11, and the passivation layer 36 is formed on the entire surface of the lower substrate 11 including the thin film transistor T. Then, a plurality of protrusions 37a of photoacryl material are formed on the passivation layer 36 at fixed intervals. The plurality of protrusions 37a are formed on the entire surface of the lower substrate 11 including the thin film transistor T at fixed intervals to improve an reflection angle of light.

The reflective electrode 16 is formed on the passivation layer 36 having the protrusions 37a and electrically connected to the drain electrode 31 of the thin film transistor T. The reflective electrode 16 has an uneven surface because of the protrusions 37a formed on the passivation layer 36. Accordingly, if incident light is reflected and emitted, the reflective electrode 16 condenses the light incident on the protrusions 37 from different angles, and emits the condensed light in a predetermined angle. An organic insulating layer 38 is formed on the entire surface of the lower substrate 11 including the protrusions 37a, and the reflective electrode 16 is formed on the organic insulating layer 38.

FIG. 6A to FIG. 6E are cross-sectional views illustrating manufacturing process steps of the related art LCD device taken along line IV-IV' of FIG. 4.

As shown in FIG. 6A, the passivation layer 36 is formed on the entire surface of the lower substrate 11 including the thin film transistor T and the photoacryl resin 37 is deposited on the passivation layer 36.

In FIG. 6B, the photoacryl resin 37 is patterned by an exposure and developing process, thereby forming a plurality of photoacryl resin patterns 37b at fixed intervals.

In FIG. 6C, the plurality of photoacryl resin 37b are reflowed by a heat treatment, thereby forming a plurality of hemisphere-shaped protrusions 37a.

In FIG. 6D, the organic insulating layer 38 is formed on the entire surface of the lower substrate 11 including the hemisphere-shaped protrusions 37a. Next, the organic insulating layer 38 and the passivation layer 36 are selectively removed by photolithography to expose the drain electrode 31 of the thin film transistor, thereby forming the contact hole 35.

In FIG. 6E, the opaque metal layer having great reflectivity, such as aluminum Al, is deposited on the entire surface of the lower substrate 11 including the contact hole 35 and then selectively removed by photolithography, whereby the reflective electrode 16 is formed in the pixel region in contact with the drain electrode 31. The reflective electrode 16 is the pixel electrode. The reflective electrode 16 has an uneven surface because of the plurality of protrusions 37a.

However, the method of manufacturing the related art LCD device has the following disadvantages. In the manufacturing method for the related art LCD device, photoacryl is used for forming the reflective electrode having the uneven surface, and a heat treatment has to be performed, whereby the manufacturing process is complicated and the manufacturing cost increases.

SUMMARY OF THE INVENTION

Accordingly, the present invention is directed to a method for manufacturing an LCD device that substantially obviates one or more problems due to limitations and disadvantages of the related art.

An advantage of the present invention is to provide to a method for manufacturing an LCD device having a reflective electrode with protrusions using simplified manufacturing process steps, thereby improving reflectivity.

Additional features and advantages of the invention will be set forth in the description which follows, and in part will become apparent from the description or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described, a method for manufacturing an LCD device includes The method includes: forming a first insulating layer on a substrate; forming a photoresist layer on the first insulating layer, wherein the photoresist layer has a plurality of rounded protrusions and rounded valleys; forming a plurality of rounded protrusions and rounded valleys on the first insulating layer by etching the first insulating layer and the photoresist layer; and forming a reflective electrode on the first insulating layer. The first insulating layer may be formed of an organic insulating layer such as acrylic resin, polyimide, BCB, oxide or nitride. Also, the etching process may be performed on the entire surface of the substrate with compound gas of $SF_6$, $O_2$ and He. The step of forming the photoresist layer may include: depositing a photoresist on the first insulating layer; performing a soft bake process on the substrate on which the photoresist is deposited at a predetermined temperature for a few minutes; patterning the photoresist patterns by performing an exposure and developing process to the photoresist; and performing a hard bake process on the photoresist patterns at a predetermined temperature for a few minutes. The reflective plate may be formed of any one of Al, Ag, Au, MoW, Al—Nd alloy and Cr. The method further may include a step of forming a second insulating layer on the first insulating layer before forming the reflective electrode on the first insulating layer having the protrusions.

In another aspect of the present invention is, a method for manufacturing an LCD device that includes: forming a first insulating layer on a substrate having a thin film transistor; forming a photoresist layer on the first insulating layer, wherein the photoresist layer has a plurality of rounded protrusions and rounded valleys; forming a plurality of rounded protrusions and rounded valleys on the first insulating layer by etching the first insulating layer and the photoresist layer; forming a reflective electrode on the first insulating layer; forming a second insulating layer on the first insulating layer and reflective electrode; forming a contact hole by selectively removing the first and second insulating layers to expose a predetermined portion of the thin film transistor; and forming a transparent electrode electrically connected to the drain electrode through the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings. Wherever possible, the same reference numbers will be used throughout the drawings to refer to the same or like parts.

Hereinafter, a method for manufacturing an LCD device according to the first embodiment of the present invention will be described with reference to the accompanying drawings.

FIG. 7A to FIG. 7F are cross-sectional views illustrating the manufacturing process steps of an LCD device according to the first embodiment of the present invention.

Figure 1:
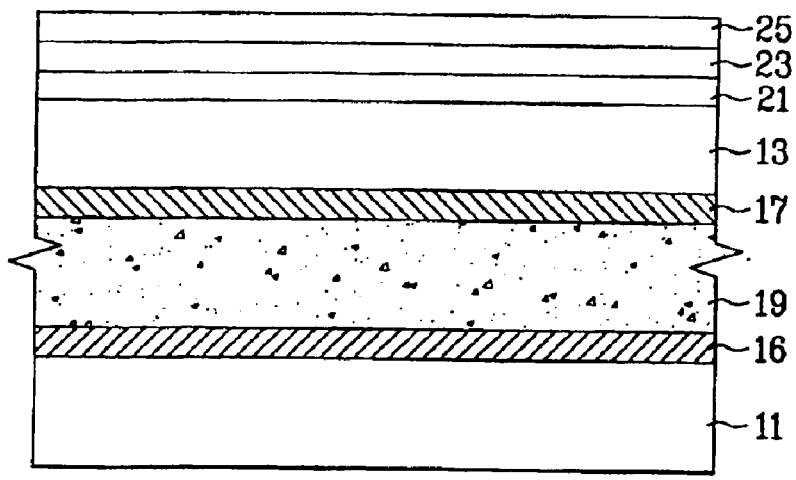
FIG. 1 is a cross-sectional view illustrating a related art reflective type color LCD device.
Figure 2:
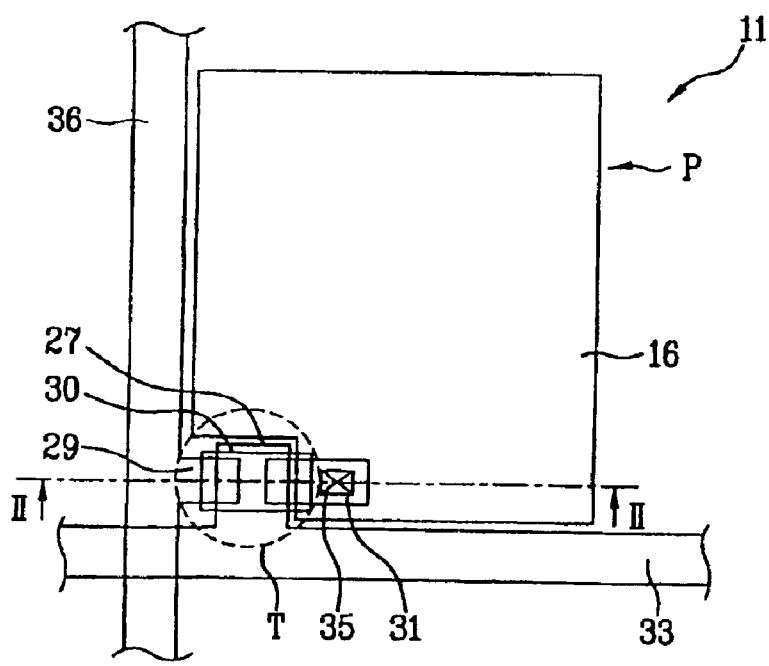
FIG. 2 is a plan view illustrating an array substrate for a related art reflective type color LCD device.
Figure 3:
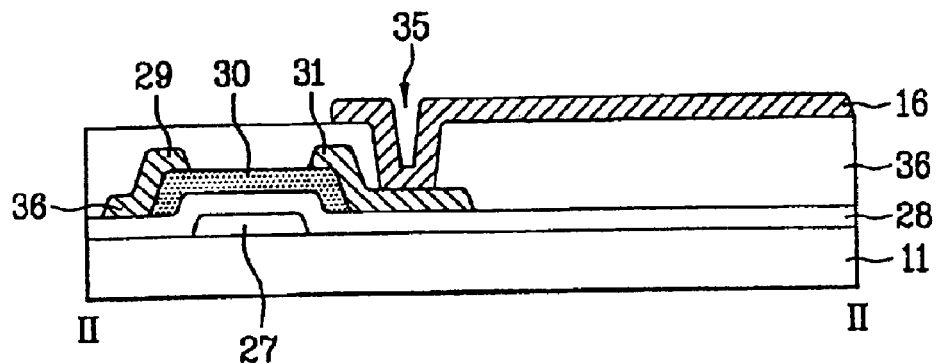
FIG. 3 is a cross-sectional view illustrating an LCD device taken along line I-I' of FIG. 2.
Figure 4:
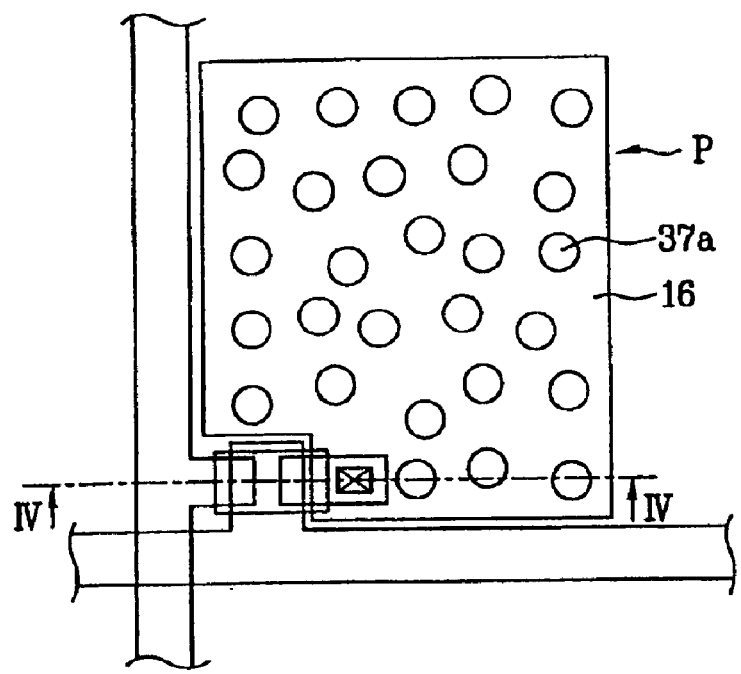
FIG. 4 is a plan view illustrating a related art LCD device including a reflective electrode having a protrusion.
Figure 5:
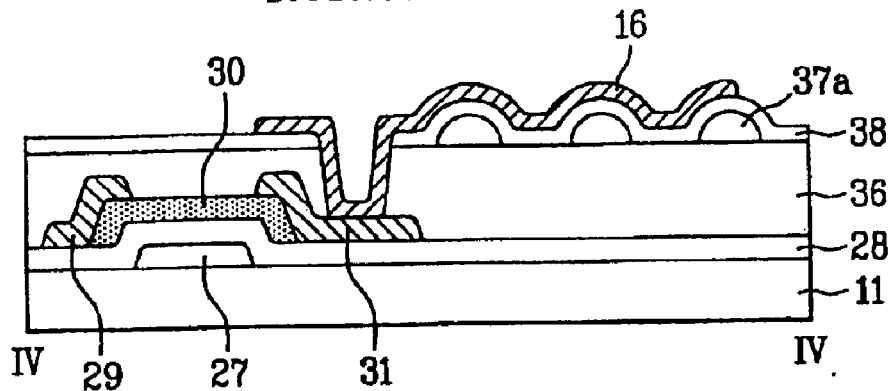
FIG. 5 is a cross-sectional view illustrating an LCD device taken along line IV-IV' of FIG. 4.
Figure 6A:
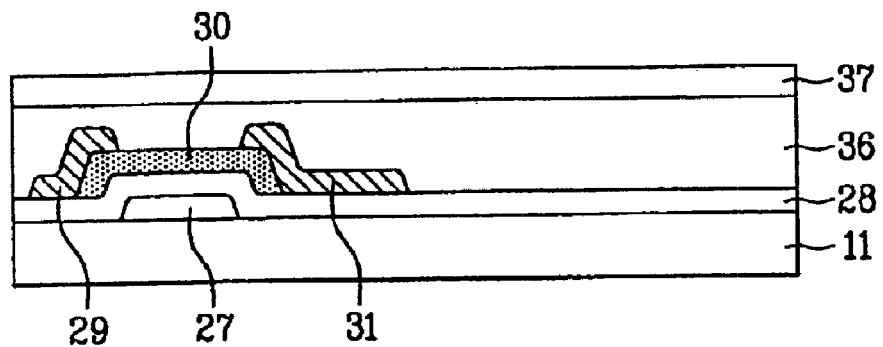
FIG. 6A to FIG. 6E are cross-sectional views illustrating manufacturing process steps of a related art LCD device taken along line IV-IV' of FIG. 4.
Figure 6B:
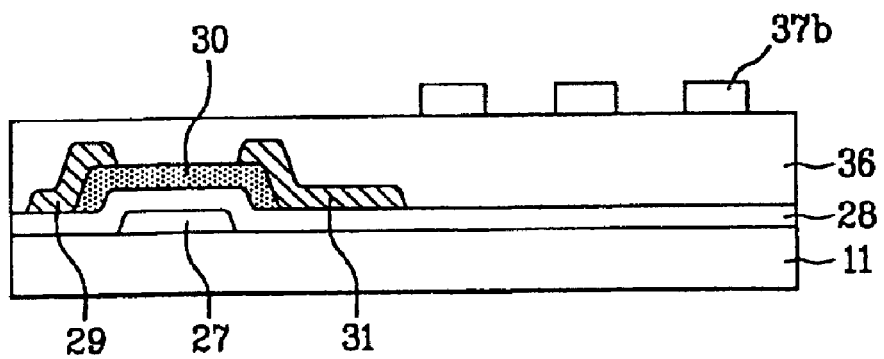
Figure 6C:
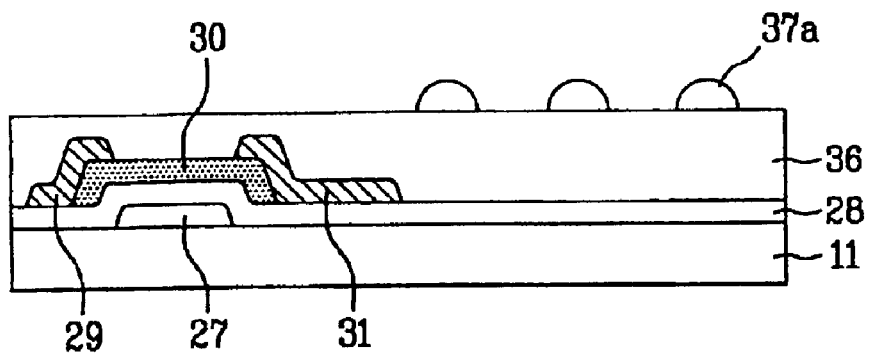
Figure 6D:
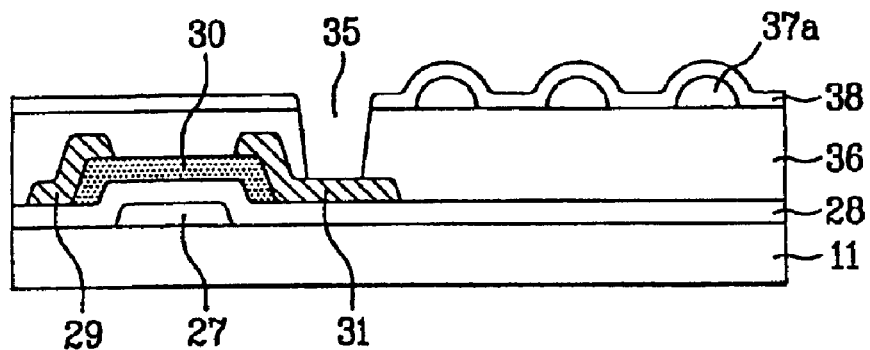
Figure 6E:
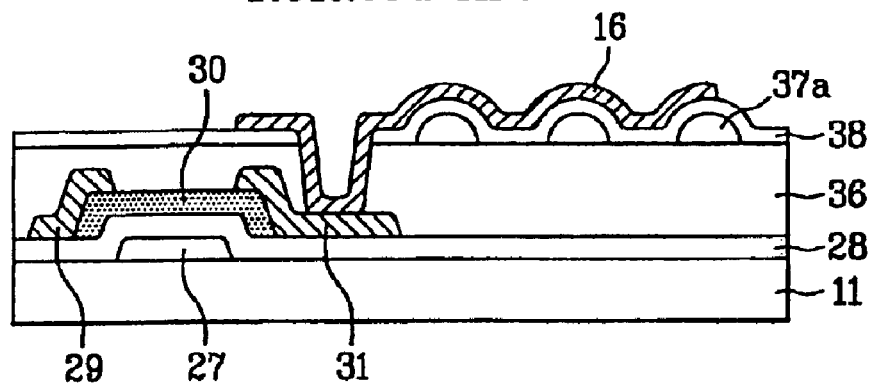
Figure 7A:
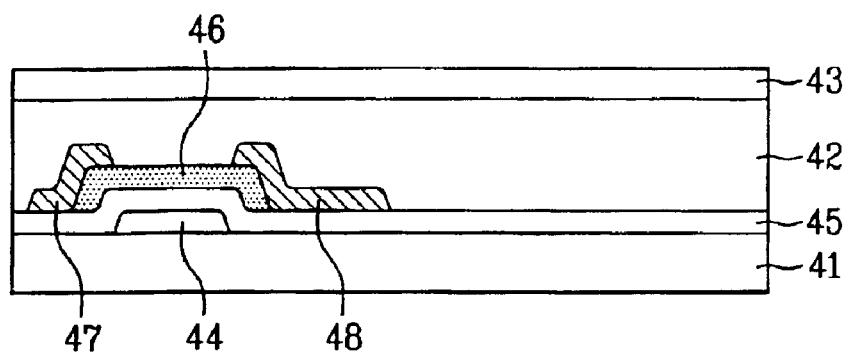
FIG. 7A to FIG. 7F are cross-sectional views illustrating manufacturing process steps of an LCD device according to the first embodiment of the present invention.

In FIG. 7A, a first insulating layer 42 is formed on an entire surface of a lower substrate 41 including a thin film transistor. The first insulating layer 42 may be formed of an organic insulating layer such as acrylic resin, polyimide, BenzoCycloButene (BCB), oxide layer, or nitride layer at a thickness between about 1 $\mu$m and about 5 $\mu$m. Next, a photoresist layer 43 is deposited on the first insulating layer 42. Then, a soft bake process may be performed on the lower substrate 41 to volatilize an organic solvent from the photoresist 43 deposited on the entire surface of the lower substrate 41 at a low temperature of about 80□ for two minutes. The soft bake process may be a hot plate method, a nitride heating method, an infrared heating method, a microwave heating method, and a thermostatic bath method.

In general, the thin film transistor may include a gate electrode 44 on a predetermined region of the lower substrate 41, a gate insulating layer 45 on the entire surface of the lower substrate 41 including the gate electrode 44, a semiconductor layer 46 on the gate insulating layer 45 above the gate electrode 44, and source/drain electrodes 47 and 48 for being partially overlapped with the semiconductor layer 46 at a predetermined interval.

Figure 7B:
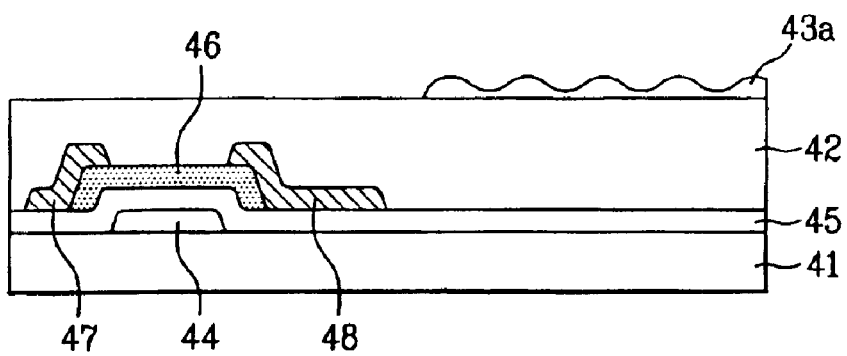

As shown in FIG. 7B, the photoresist 43 may be patterned by an exposure and developing process, thereby forming photoresist layer 43a with rounded protrusions and rounded valleys. Then, a hard bake process is performed to the photoresist layer 43a with rounded protrusions and rounded valleys at a high temperature between about 100 degrees Celsius and about 200 degrees Celsius for about two or three minutes. At this point, the photoresist layer 43a has small rounded mask patterns (diameter about 5 $\mu$m), i.e., it is possible to pattern rounded protrusions and rounded valleys in a photo process.

The hard bake process may be performed to harden the photoresist layer 43a. After the exposure and developing process, the photoresist layer 43a may have unevaporated organic ingredients or unhardened portions. Thus, a heat treatment is performed to the photoresist layer 43a resulting in the photoresist layer 43a that strongly adhere to the first organic insulating layer 42. Also, it is possible to improve etching-resistance characteristics of the photoresist layer 43a.

Figure 7C:
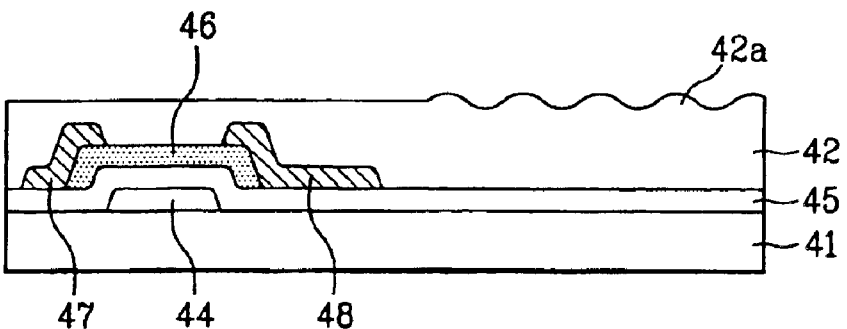

In FIG. 7C, the entire surface of the lower substrate 41 is etched including the photoresist layer 43a and the first insulating layer 42, so that the shape of the photoresist layer 43a is copied, and the first insulating layer 42 is removed at a predetermined thickness. Thus, a plurality rounded protrusions 42a and rounded valleys are formed on the surface of the first insulating layer 42. At this point, a compound gas of $SF_6$, $O_2$ and He may be used for etching the entire surface of the lower substrate 41 including the photoresist layer 43a.

Meanwhile, the rounded protrusions 42a and rounded valleys may be formed in the first insulating layer 42 by a dry etch. When removing the photoresist layer 43a by etching, the first organic insulating layer 42 may have an uneven surface having a plurality of rounded protrusions 42a and rounded valleys resulting from the photoresist layer 43a. The rounded protrusions and rounded valleys in the photoresist layer 43a formed by the general photoresist are heat-resistant and chemical-resistant, so that it is hard to form the rounded protrusions and rounded valleys on the devices directly.

Figure 7D:
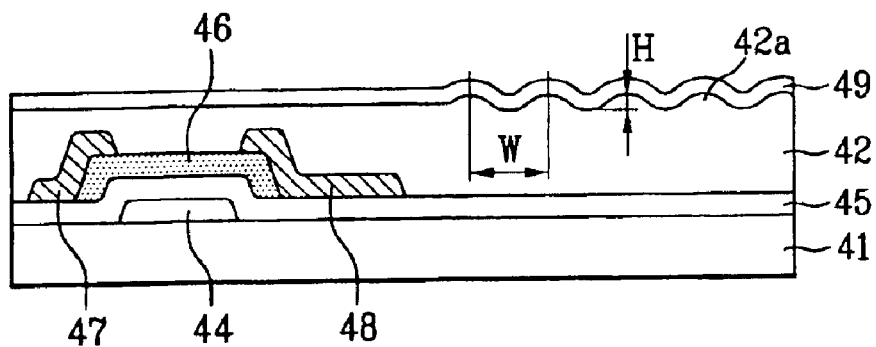

As shown in FIG. 7D, a second insulating layer 49 may be formed of the same material as the first insulating layer 42 on the entire surface of the lower substrate 41 including the first insulating layer having the rounded protrusions 42a and rounded valleys with a predetermined thickness. After forming the plurality of rounded protrusions 42a and rounded valleys on the surface of the first insulating layer 42, the second insulating layer 49 may be over-coated with the same (similar) material as that of the first insulating layer 42 so as to substantially eliminate the flat region between the rounded protrusions 42a resulting in rounded valleys. Alternatively, it is not required to form the second insulating layer 49 on the first insulating layer 42 having the plurality of rounded protrusions 42a and rounded valleys. In order to improve photo-efficiency, it is preferable to form the rounded protrusions 42a and rounded valleys so that the distance or height H between a top of the rounded protrusion and a bottom of the adjacent rounded valley is about 0.5 $\mu$m to 1 $\mu$m. Also, it is preferable to form the height H of the protrusion 42a and a distance W between center points of the rounded protrusions 42a at a ratio of 1 to 10 through 1 to 30.

Figure 7E:
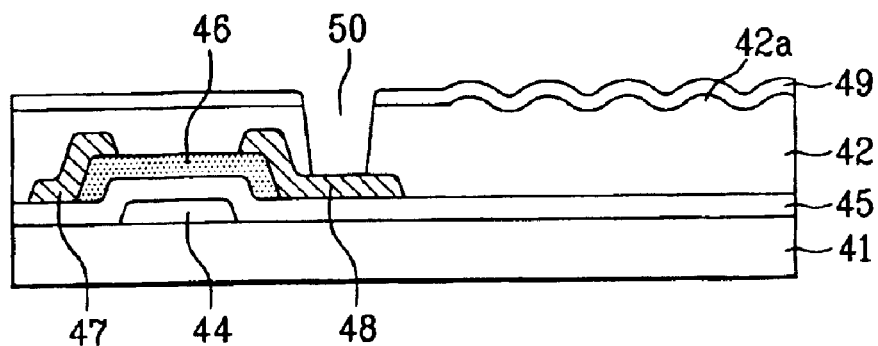

Referring to FIG. 7E, the first and second insulating layers 42 and 49 are selectively removed to expose the drain electrode of the thin film transistor, thereby forming a contact hole 50.

Figure 7F:
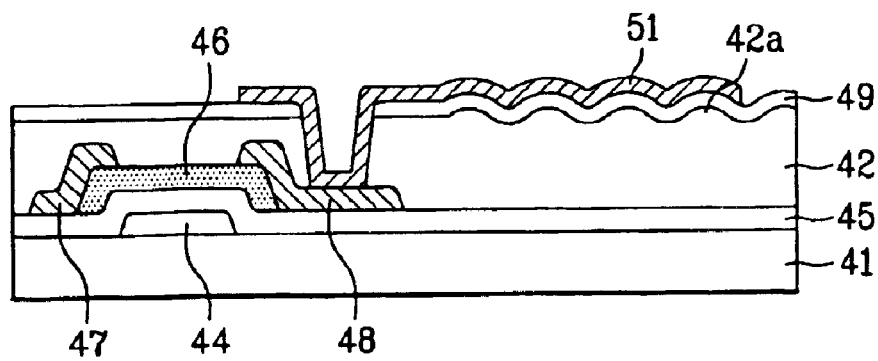

As shown in FIG. 7F, a conductive opaque metal having high reflectivity such as aluminum Al is deposited on the entire surface of the lower substrate 41 including the contact hole 50, and then selectively removed by photolithography resulting in a reflective electrode 51 in a pixel region in contact with the drain electrode. The reflective electrode 51 is the pixel electrode. The reflective electrode 51 has an uneven surface because of the protrusions 42a formed on the surface of the first insulating layer 42. The conductive opaque metal layer having high reflectivity may be made of Al, Ag, Au, MoW, Al—Nd alloy or Cr.

In the aforementioned LCD device according to the present invention, the reflective electrode 51 has an uneven surface, whereby reflectivity of the reflective electrode 51 is improved.

Figure 8:
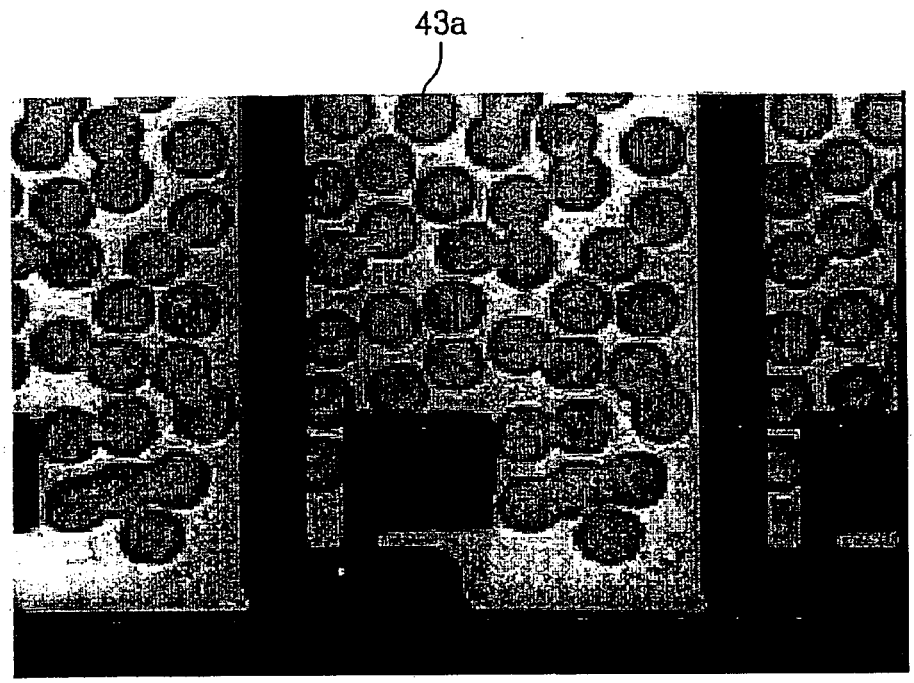
FIG. 8 is a photograph illustrating a photoresist layer state of FIG. 7B.

FIG. 8 is a photograph illustrating a photoresist layer 43a state of FIG. 7B. The plurality of rounded protrusions and rounded valleys in the photoresist layer 43a are formed in the pixel region.

Figure 9:
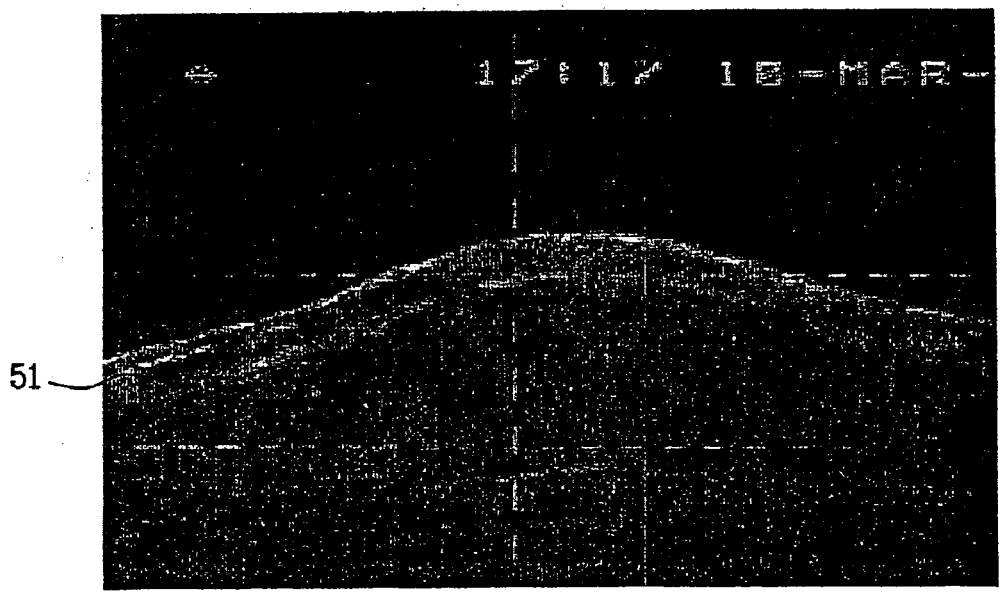
FIG. 9 is a cross-sectional photograph illustrating the state after completing reflective electrode of FIG. 7F.

FIG. 9 is a photograph illustrating the state of the reflective electrode 51 after completing the reflective electrode. The reflective electrode 51 has an uneven surface.

Herein, the method for manufacturing a reflective type LCD device according to the present invention is described. However, it is possible to form a transflective type LCD device having a reflective part with an uneven surface by the method of the present invention. Also, the reflective electrode 51 serves as the pixel electrode in the method for manufacturing the reflective LCD device of the present invention. Additionally, the pixel electrode may be formed after forming the reflective electrode having the uneven surface.

FIG. 10A to FIG. 10G are cross-sectional views illustrating manufacturing process steps of an LCD device according to a second embodiment of the present invention.

Figure 10A:
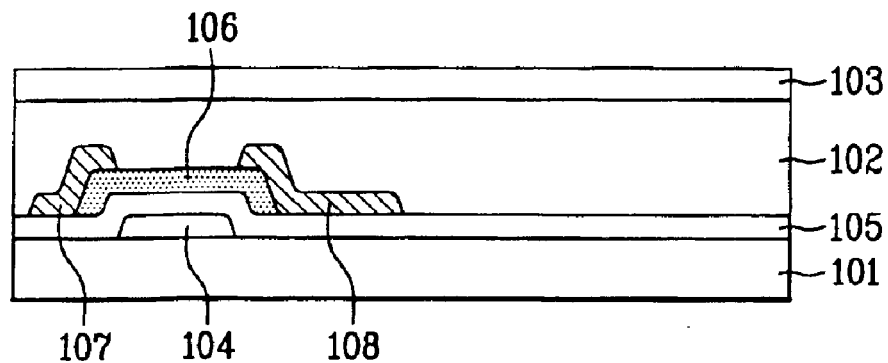
FIG. 10A to FIG. 10G are cross-sectional views illustrating manufacturing process steps of an LCD device according to the second embodiment of the present invention.

As shown in FIG. 10A, a first insulating layer 102 may be formed on an entire surface of a lower substrate 101 including a thin film transistor. The first insulating layer 102 may be formed of an organic insulating layer such as acrylic resin, polyimide, BenzoCycloButene (BCB), oxide layer, or nitride layer with a thickness between about 1 $\mu$m and about 5 $\mu$m. Next, a photoresist 103 may be deposited on the first insulating layer 102. Then, a soft bake process may be performed at a temperature of about 80 $\mu$m for two minutes on the lower substrate 101 to volatilize the organic solvent from the photoresist 103 deposited on the entire surface of the lower substrate 101. The soft bake process may be a hot plate method, a nitride heating method, an infrared heating method, a microwave heating method, and a thermostatic bath method.

In general, the thin film transistor may include a gate electrode 104 on a predetermined region of the lower substrate 101, a gate insulating layer 105 on the entire surface of the lower substrate 101 including the gate electrode 104, a semiconductor layer 106 on the gate insulating layer 105 above the gate electrode 104, and source/drain electrodes 107 and 108 for being partially overlapped with the semiconductor layer 106 at a predetermined interval.

Figure 10B:
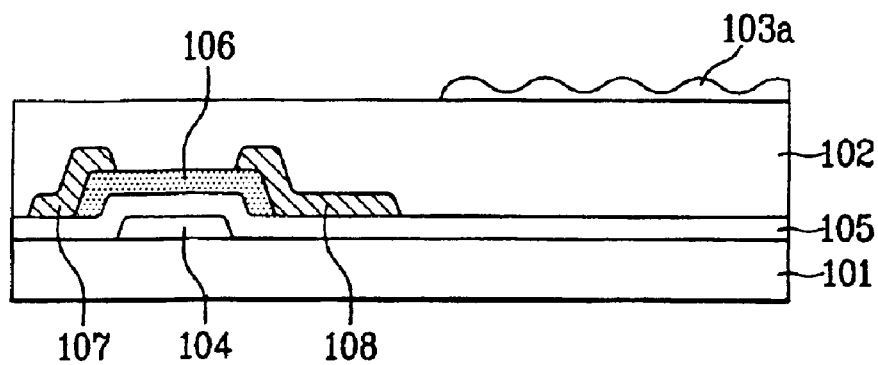

As shown in FIG. 10B, the photoresist 103 may be patterned by an exposure and developing process, thereby forming photoresist layer 103a with rounded protrusions and rounded valleys. Then, a hard bake process is performed to the photoresist layer 103a at a temperature between about 100 degree Celsius and about 200 degrees Celsius for about two or three minutes. At this point, the photoresist layer 103a has small rounded mask patterns (diameter about 5 $\mu$m), i.e., it is possible to pattern rounded protrusions and rounded valleys in a photo process.

The hard bake process may be performed to harden the photoresist layer 103a. After the exposure and developing process, the photoresist layer 103a may have unevaporated organic ingredients or unhardened portions. Thus, a heat treatment is performed to the photoresist layer 103a resulting in photoresist layer 103a that strongly adhere to the first organic insulating layer 102. Also, it is possible to improve etching-resistance characteristics of the photoresist layer 103a.

Figure 10C:
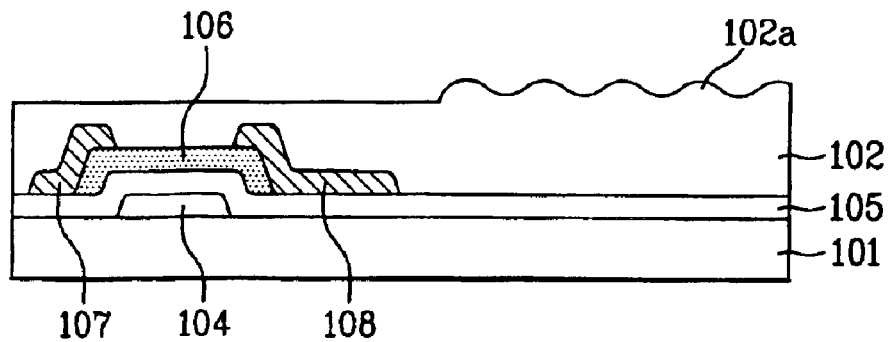

In FIG. 10C, the entire surface of the lower substrate 101 is etched including the photoresist layer 103a, so that the shape of the photoresist layer 103a is copied, and the first insulating layer 102 is removed to a predetermined thickness. Thus, a plurality of rounded protrusions 102a and rounded valleys are formed on the surface of the first insulating layer 102. At this point, a compound gas of $SF_6$, $O_2$ and He gas may be used for etching the entire surface of the lower substrate 101 including the photoresist layer 103a.

Meanwhile, the rounded protrusions 102a and rounded valleys may be formed in the first insulating layer 102 by a dry etch. When removing the photoresist layer 103a by etching, the first organic insulating layer 102 may have an uneven surface having a plurality of rounded protrusions 102a and rounded valleys resulting from the photoresist layer 103a. The rounded protrusions and rounded valleys in the photoresist layer 103a formed by the general photoresist are heat-resistant and chemical-resistant, so that it is hard to form the protrusions on the devices directly.

Figure 10D:
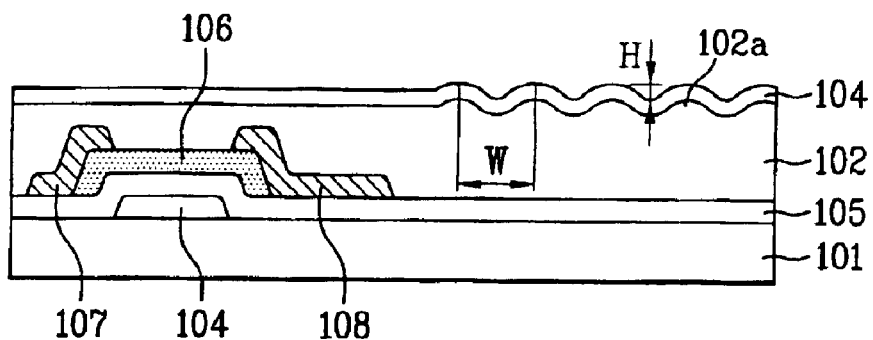

As shown in FIG. 10D, a second insulating layer 109 may be formed of the same material as the first insulating layer 102 on the entire surface of the lower substrate 101 including the first insulating layer 102 having the rounded protrusions 102a and rounded valleys with a predetermined thickness. After forming the plurality of rounded protrusions 102a and rounded valleys on the surface of the first insulating layer 102, the second insulating layer 109 may be over-coated with the same (similar) material as that of the first insulating layer 102 so as to substantially eliminate the flat region between the rounded protrusions 102a resulting in rounded valleys. Alternatively, it is not required to form the second insulating layer 109 on the first insulating layer 102 having the plurality of rounded protrusions 102a and rounded valleys. In order to improve photo-efficiency, it is preferable to form the rounded protrusions 102a and rounded valleys so that the distance or height H between a top of the rounded protrusion and a bottom of the adjacent rounded valley is about 0.5 μm to about 1 μm. Also, it is preferable to form the height H of the protrusion 102a and a distance W between center points of the protrusions 102a at a ratio of 1 to 10 through 1 to 30.

Figure 10E:
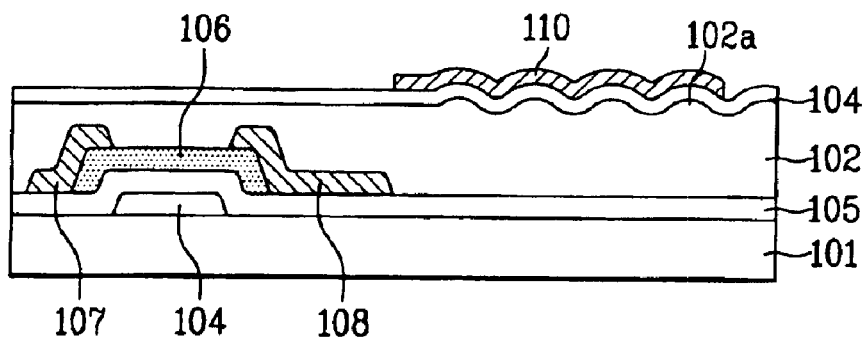

Referring to FIG. 10E, an opaque metal layer may be deposited on the entire surface of the lower substrate 101, and then selectively removed by photolithography, thereby forming a reflective electrode 110. The reflective electrode 110 may have an uneven surface according to the plurality of rounded protrusions 102a and rounded valleys on the first insulating layer 102. Herein, the opaque metal layer may be formed from one of Al, Ag, Au, MoW, Al—Nd alloy, and Cr.

Figure 10F:
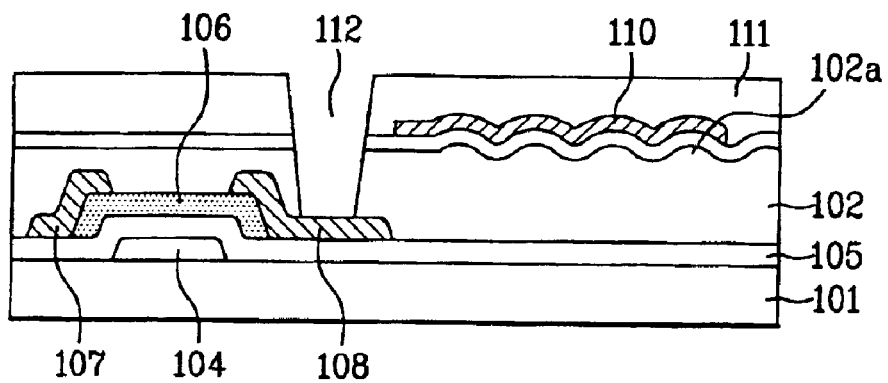

As shown in FIG. 10F, a third insulating layer 111 may be formed on the entire surface of the lower substrate 110 including the reflective electrode 110, and then the first, second and third insulating layers 102, 109 and 111 may be selectively removed to expose a predetermined portion of the drain electrode 108 by photolithography, thereby forming a contact hole 112.

Figure 10G:
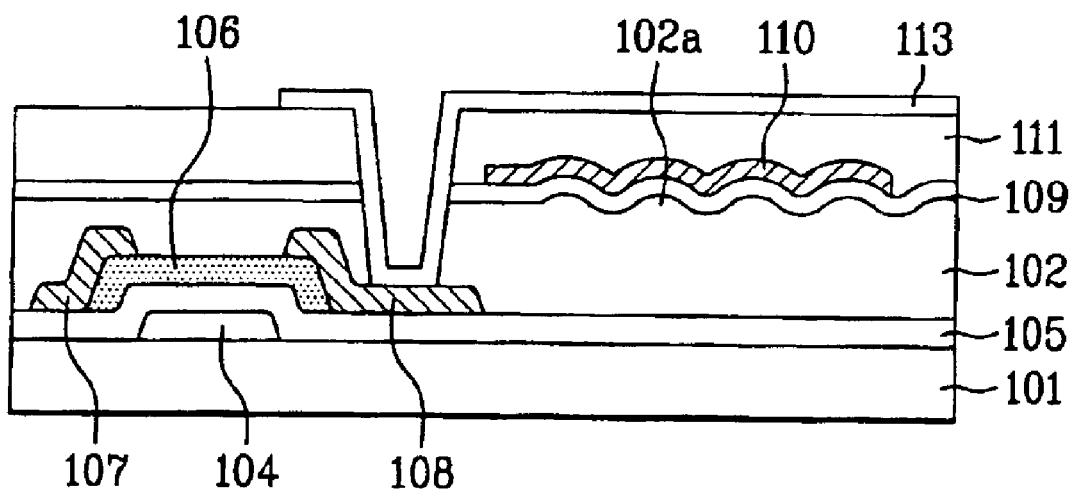

Referring to FIG. 10G, a transparent metal layer may be deposited on the entire surface of the lower substrate 101 including the contact hole 112, and then selectively removed by photolithography. As a result, a transparent electrode 113 is formed and is electrically connected to the drain electrode 108 through the contact hole 112, and the transparent electrode 113 covers the reflective electrode 110. The transparent metal layer may be formed of Indium-Tin-Oxide (ITO), Indium-Zinc-Oxide (IZO) or Indium-Tin-Zinc-Oxide (ITZO) by a CVD method or sputtering.

As mentioned above, the method for manufacturing the LCD device according to the present invention has the following advantages. After forming the photoresist layer with rounded protrusions and rounded valleys on the insulating layer, the photoresist layer and the insulating layer may be etched at the same time, so that the rounded protrusions and rounded valleys are formed on the insulating layer, and then the reflective electrode is formed thereon, thereby improving reflectivity. The reflective electrode having the rounded protrusions and rounded valleys is formed with a general photoresist layer, thereby decreasing manufacturing costs. Also, the reflective electrode having the rounded protrusions and rounded valleys is formed by simplified manufacturing process steps, thereby obtaining a high quality reflective or transflective LCD device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing an LCD device comprising:
   forming a first insulating layer on a substrate;
   depositing a photoresist on the first insulating layer;
   performing a soft bake process on the substrate on which the photoresist is deposited at a predetermined temperature for a few minutes;
   patterning the photoresist patterns by performing exposure and developing process to the photoresist: and
   performing a hard bake process on the photoresist patterns at a predetermined temperature for a few minutes;
   copying the photoresist patterns by etching an entire surface of the substrate, and forming a plurality of protrusions on the first insulating layer by etching the first insulating layer at a predetermined thickness; and
   forming a reflective electrode on the first insulating layer including the protrusions.

2. The method of claim 1, wherein the first insulating layer is formed of an organic insulating layer.

3. The method of claim 1, wherein the first insulating layer is formed of any one of acrylic resin, polyimide, BCB, oxide layer and nitride layer.

4. The method of claim 1, wherein the first insulating layer is formed at a thickness between 1 μm and 5 μm.

5. The method of claim 1, wherein the etching process is performed to the entire surface of the substrate with compound gas of $SF_6$, $O_2$ and He.

6. The method of claim 1, wherein the soft bake process is performed at a temperature of 80 degree for two minutes.

7. The method of claim 1, wherein the hard bake process is performed at a temperature between 100 degree and 200 degree for two to three minutes.

8. The method of claim 1, wherein the reflective electrode is formed of any one of Al, Ag, MoW, Al—Nd alloy and Cr.

9. The method of claim 1, further comprising a step of forming a second insulating layer on the first insulating layer before forming the reflective electrode on the first insulating layer having the protrusions.

10. The method of claim 9, wherein the first insulating layer is formed of the same material as that of the second insulating layer.

11. The method of claim 1, wherein the protrusion of the first insulating layer has a height of 0.5 μm to 1 μm.

12. A method of manufacturing an LCD device comprising:
   forming a first insulating layer on a substrate having a thin film transistor;
   depositing a photoresist on the first insulating layer;
   performing a soft bake process on the substrate on which the photoresist is deposited at a predetermined temperature for a few minutes;
   patterning the photoresist patterns by performing exposure and developing process to the photoresist; and
   performing a hard bake process on the photoresist patterns at a predetermined temperature for a few minutes;
   copying the photoresist patterns by etching an entire surface of the substrate, and forming a plurality of protrusions on the first insulating layer by etching the first insulating layer at a predetermined thickness;
   forming a second insulating layer on the first insulating layer having the plurality of protrusions;
   forming a reflective electrode on the second insulating layer;
   forming a third insulating layer on the entire surface of the substrate including the reflective electrode;

forming a contact hole by selectively removing the first, second and third insulating layers to expose a predetermined portion of the thin film transistor; and forming a transparent electrode for being electrically connected to the drain electrode through the contact hole.

13. The method of claim 12, wherein the first and second insulating layers are formed of the same material.

14. The method of claim 12, wherein the first and second insulating layers are formed of any one of acrylic resin, polyimide, BCB, oxide layer and nitride layer.

15. The method of claim 12, wherein the first insulating layer is formed at a thickness between 1 μm and 5 μm.

16. The method of claim 12, wherein the etching process is performed on the entire surface of the substrate with a compound gas of $SF_6$, $O_2$ and He.

17. The method of claim 12, wherein the reflective electrode is formed of any one of Al, Ag, MoW, Al-Nd alloy and Cr.

18. The method of claim 12, wherein the transparent electrode is formed of one of ITO, IZO and ITZO.

* * * * *